US012680294B2

(12) United States Patent
Hoff

(10) Patent No.: US 12,680,294 B2
(45) Date of Patent: Jul. 14, 2026

(54) SYSTEM AND METHOD FOR LIFTING PREJOINED DECK COMPONENTS

(71) Applicant: Klover SEPA, Inc., Quakertown, PA (US)

(72) Inventor: Joshua Daniel Hoff, Easton, PA (US)

(73) Assignee: Klover SEPA, Inc., Quakertown, PA (US)

( * ) Notice: Subject to any disclaimer, the term of this patent is extended or adjusted under 35 U.S.C. 154(b) by 547 days.

(21) Appl. No.: 17/981,072

(22) Filed: Nov. 4, 2022

(65) Prior Publication Data

US 2024/0159042 A1 May 16, 2024

(51) Int. Cl.

| | |
|---|---|
| ***E04B 1/35*** | (2006.01) |
| ***B66C 1/02*** | (2006.01) |
| ***B66C 1/06*** | (2006.01) |
| ***B66C 1/22*** | (2006.01) |
| ***B66C 1/66*** | (2006.01) |
| ***E04B 1/00*** | (2006.01) |

(52) U.S. Cl.

CPC .............. *E04B 1/3511* (2013.01); *B66C 1/02* (2013.01); *B66C 1/06* (2013.01); *B66C 1/22* (2013.01); *B66C 1/66* (2013.01); *E04B 1/003* (2013.01); *E04B 2001/3588* (2013.01)

(58) Field of Classification Search

CPC .................. E04B 1/3511; E04B 1/003; E04B 2001/3588; E04B 5/10; B66C 1/02; B66C 1/06; B66C 1/22; B66C 1/66; B66C 1/0243; B66C 1/12

See application file for complete search history.

(56) References Cited

U.S. PATENT DOCUMENTS

| | | | | |
|---|---|---|---|---|
| 10,745,919 | B1 * | 8/2020 | Houston | E04B 5/10 |
| 12,319,543 | B2 * | 6/2025 | Særvoll | B66C 1/24 |
| 2009/0232623 | A1 * | 9/2009 | Munro | E04G 21/167 414/10 |
| 2017/0241126 | A1 * | 8/2017 | Konduc | E04B 1/3511 |
| 2020/0190790 | A1 * | 6/2020 | Schambach | E04G 21/163 |

* cited by examiner

*Primary Examiner* — Stephen A Vu

(74) *Attorney, Agent, or Firm* — Lisa E. Geary; Eckert Seamans Cherin & Mellott LLC

(57) ABSTRACT

A system and method for rigging and lifting a joined, multi-section assembly of corrugated decking sections for attachment to a Cold-Form Steel. The system and method provide for the utilization of an adaptable rig that securely attaches to a multi-section assembly of corrugated decking sections which have be pre-joined by workers in a safe, preferably terrestrial, workspace. The adaptability of the rig enables it to provide attachment points for lifting and supporting the multi-sectioned decking assemblies of disparate sizes and materials. The location and number of these attachment points being a function of the size, gauge, area and aggregate weight of a given pre-joined multi-section assembly. The system and method are can be utilized with pre-joined multi-section assemblies consisting of individual decking sections fabricated from a variety of materials, including ferrous metals, non-ferrous metals, as well as composite materials.

19 Claims, 14 Drawing Sheets

PRIOR ART

SYSTEM AND METHOD FOR LIFTING PREJOINED DECK COMPONENTS

BACKGROUND OF THE INVENTION

Construction methods utilizing Cold-Form Steel ("CFS") framing provides a cost-effective, versatile and reliable means of fabricating low-rise and mid-rise structures, such as those providing multi-unit housing and/or commercial space. CFS construction relies on the use of pre-fabricated panelized components to construct load-bearing walls and related support structures in framing a given building. CFS has also gained acceptance in the market due to the relatively short time frame in which large, complex structures can be designed and built (when compared to other conventional construction methods).

The CFS panelized components are fabricated from structural-quality steel that is roll-formed into support members that typically have an open rectangular or "C" shaped cross-section, thus creating relatively light-weight members that exhibit excellent rigidity and load-bearing characteristics. Various gauges of steel can be utilized in fabricating CFS components, thereby allowing particular components to be customized as a function of the loads and forces that will be placed upon in them in a given application.

As each particular level of a multi-story CFS building project is completed, flooring must be laid. Typically the flooring process for a CFS building involves the laying of prefabricated corrugated decking atop CFS framing. FIG. 1 provides a depiction of a typical CFS framed structure 100. As shown, three corrugated decking sections (102, 104 and 106) are secured atop CFS framing 108. The corrugated decking sections are typically bundled (110) and lifted via crane or other means so that they are placed atop of a CFS framing structure (100). Workers then manually separate the bundles decking sections and place and secure them (either via welding or fasteners) in the appropriate locations so as to complete the flooring of the CFS framing. This manual process is time consuming and can be quite hazardous as the particular CFS structure being floored may be many stories up. The need for workers to deliberately and carefully navigate the CFS framing while separating, placing and securing the decking sections only adds to the overall time required to complete the decking process. Once the deck is complete, it is typically covered in a layer of composite cement which will serve as load-bearing flooring in the CFS structure.

Given the time-consuming, and possibly hazardous nature of the manual process for separating, placing and securing the individual decking sections utilized in CFS construction, it would be desirable to provide a system and method that would ensure a safer working environment and speed the flooring process. Such a system and method would ideally utilize the same, readily available prefabricated corrugated decking. In addition, ideally the utilization of the system and method should not require any substantial retraining of workers, or the utilization of specialized tools by those workers.

BRIEF SUMMARY OF THE INVENTION

A system and method for rigging and lifting a joined, multi-section assembly of corrugated decking sections for attachment to a CFS structure. The system and method provide for the utilization of an adaptable rig that securely attaches to a multi-section assembly of corrugated decking sections which have be pre-joined by workers in a safe, preferably terrestrial, workspace. The adaptability of the rig enables it to provide attachment points for lifting and supporting the multi-sectioned decking assemblies of disparate sizes and materials. The location and number of these attachment points being a function of the size, gauge, area and aggregate weight of a given pre joined multi-section assembly. The system and method can be utilized with pre-joined multi-section assemblies consisting of individual decking sections fabricated from a variety of materials, including ferrous metals, non-ferrous metals and composite materials.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
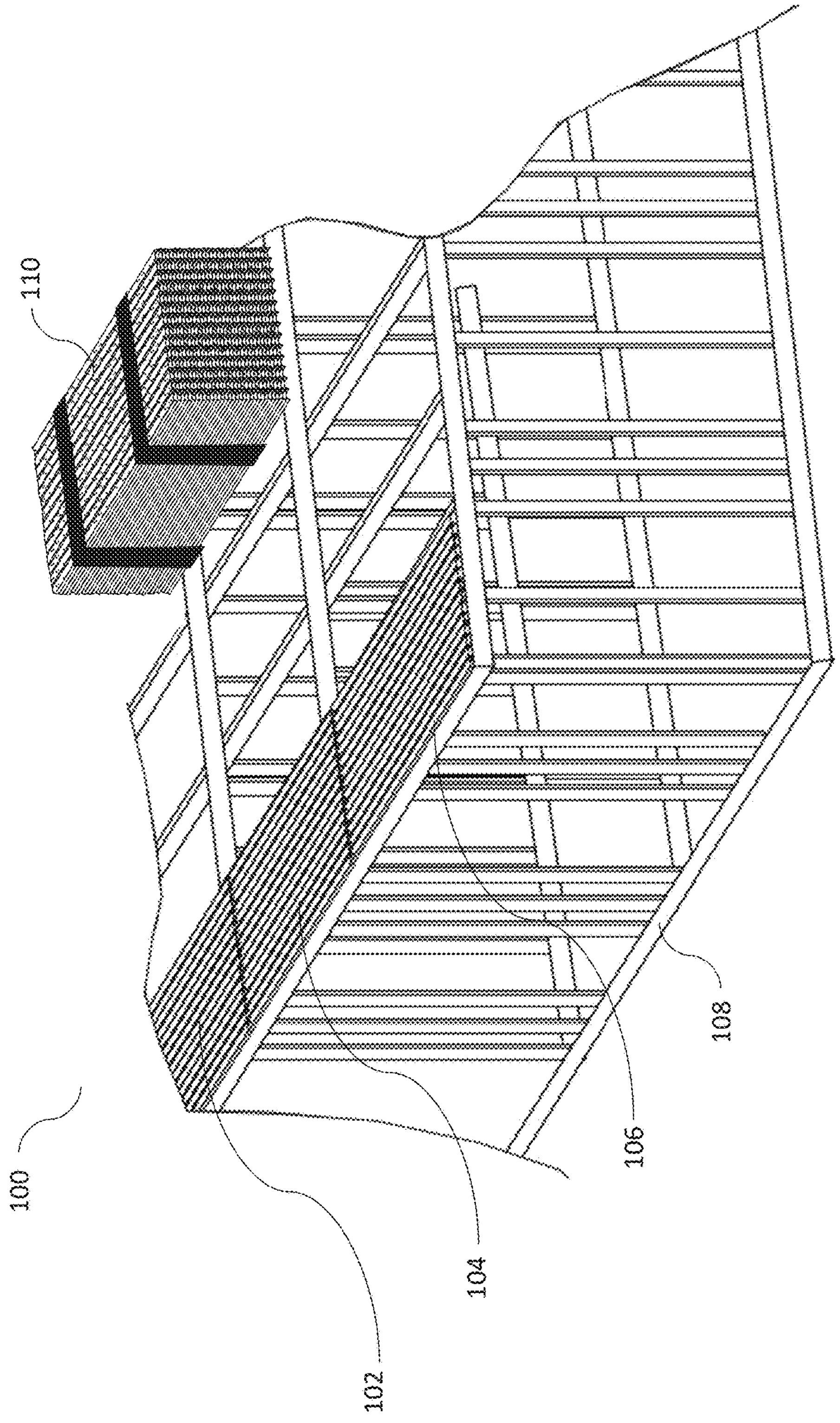
FIG. 1 is a perspective view of a CFS structure and decking sections therefor, in accordance with the prior art.
Figure 2A:
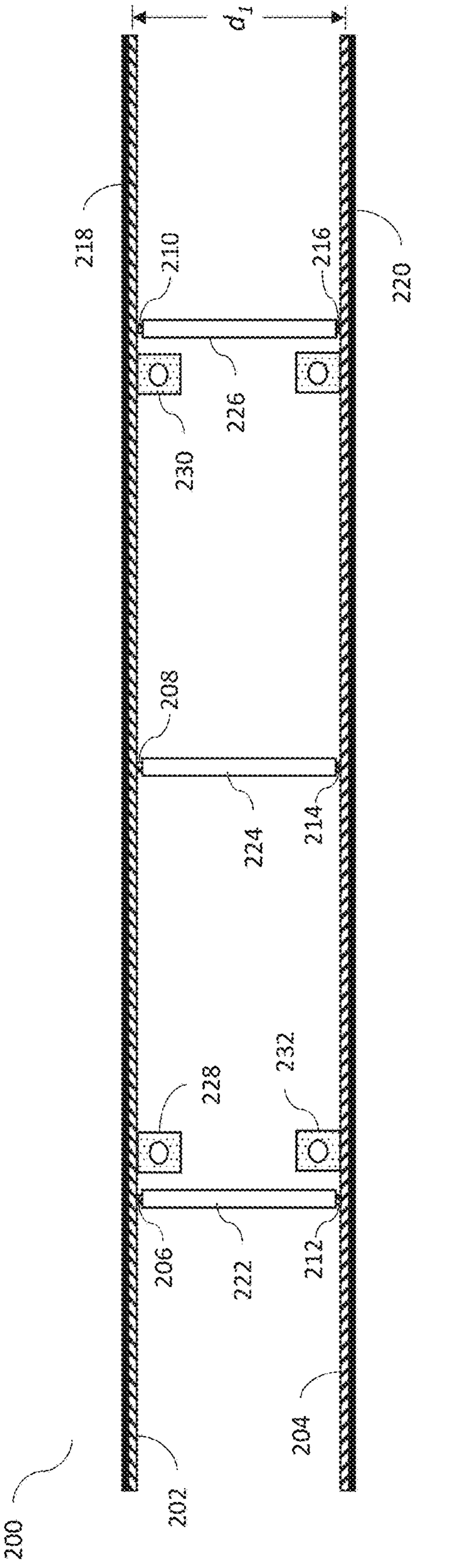
FIG. 2A is a top view of a preferred embodiment of an adjustable rig.
Figure 2B:
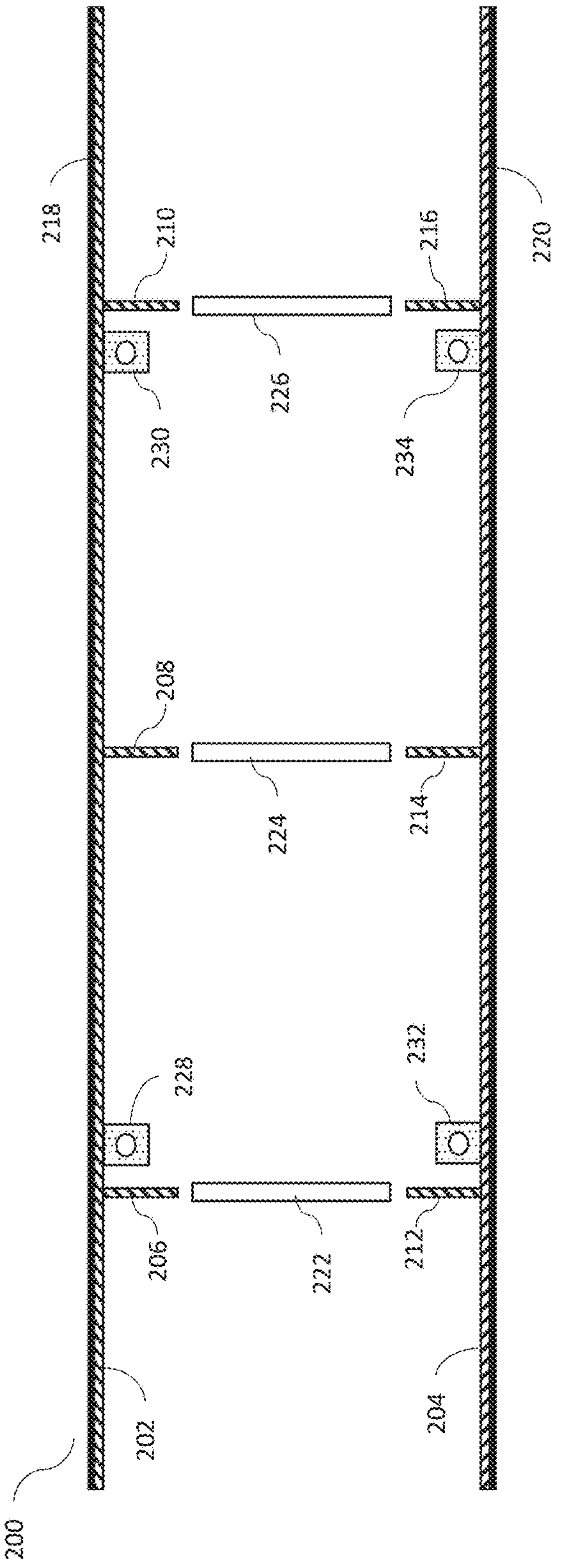
FIG. 2B is an exploded top-view of the adjustable rig of FIG. 2A.
Figure 2C:
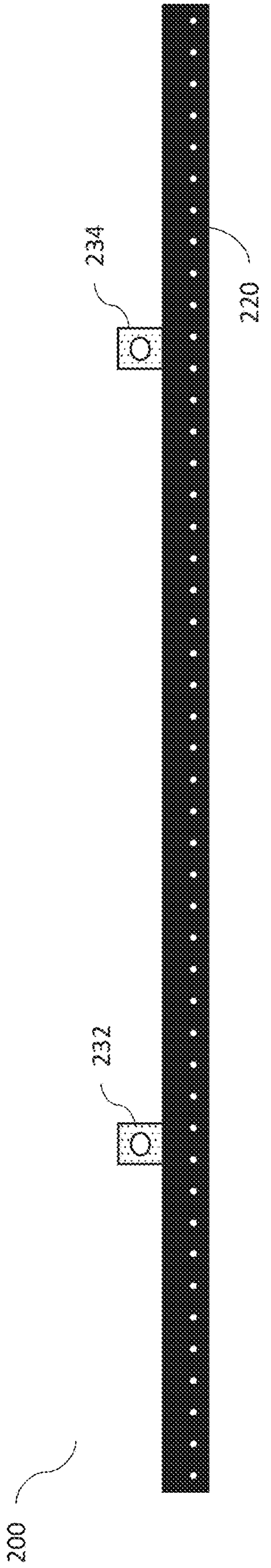
FIG. 2C is a longitudinal side-view of the adjustable rig of FIG. 2A.

FIG. 2A is top view of adaptable rig 200, in accordance with a particular preferred embodiment of the invention. FIG. 2B provides an exploded top view and FIG. 2C a side view of the adaptable rig of FIG. 2A. As shown, adaptable rig 200 includes side rails 202 and 204. Affixed to each of these side rails are three orthogonal mating posts (206. 208 and 210 on rail 202; 212, 214 and 216 on rail 204). In this preferred embodiment the side rails measure 30' in length and are fabricated from 1.5" square tube of 0.25" thick steel.

The mating posts measure 1' in length and are also fabricated from 1.5 inch square tubes of 0.25 thick steel. However the particular dimensions of the rails and tubes, as well as the thickness of the steel from which they are made can be chosen as a function of both the aggregate size and weight of the joined, multi-section assembly of corrugated decking sections which is to be lifted. In this embodiment, the mating posts are welded to the side rails, but other methods of connecting them, such as bolts or T-shaped metal housing could be utilized, as long as they were rated to withstand the loading and stresses that might be placed upon the rig and its components—Again, this would primarily be a function of both the aggregate size and weight of the joined, multi-section assembly of corrugated decking sections which is to be lifted.

Each of the side rails is connected to a side plate (plate 218 on side rail 202; plate 220 on side rail 204). Each of these plates is fabricated form a 30" by 6" plate of 0.1875" thick steel. The plates are welded to the side rails in this embodiment, but other means of affixing them to the side rails could be employed (fasteners, bolts, etc.). As shown, each of the side plates as a series of holes. These holes are adapted to mate with a chain or cable that will be used to connect the adaptable rig to its load (joined, multi-section assembly of corrugated decking sections). Note that the particular means by which the side plates are affixed to the side rails is not particularly critical, so long as it is rated to withstand the stresses and loading associated the particular loads the rig will be lifting.

Adaptable rig 200 also includes three spacers (222, 224 and 226). In this preferred embodiment each of the spacers measure 4' 10" in length and are fabricated from 2.0" square tube of 0.375" thick steel. The particular dimensions of the spacers, as well as the thickness of the steel from which they are made can be chosen as a function of both the aggregate size and weight of the joined, multi-section assembly of corrugated decking sections which is to be lifted. However, the inner dimensions of the 2.0" square steel tubing must be capable of accepting the insertion of a mating post. The post should be able to slide freely into and out of the spacer tube with little play front to back or side to side. For example, in this embodiment the outer dimensions of the mating posts are 1.5" square. A suitable spacer tube would have an inner dimension of approximately 1.625" square.

Figure 2D:
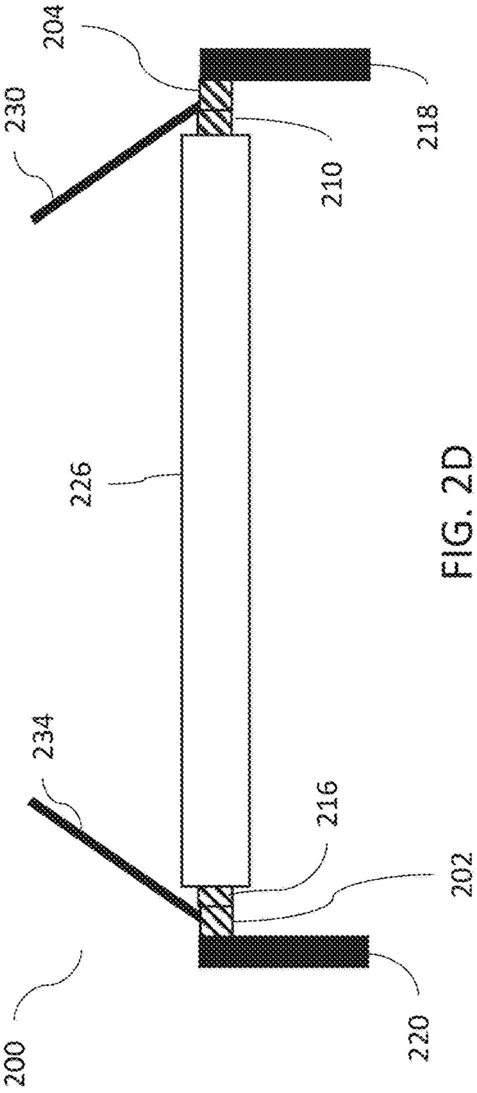
FIG. 2D is an alternate side-view of the adjustable rig of FIG. 2A.

The adaptable rig is also shown to include rigging plates 228 and 230 (mounted upon side rail 202) and rigging plates 232 and 234 (mounted upon side rail 204. In this embodiment each of these rigging plates are fabricated from a 4" square ¼" thick steel plate with a centrally located hole. The rigging plates are welded onto the side rails and angled at approximately 45° (see FIG. 2D). The hole in each rigging plate is adapted to mate with a hook or other connector associated with a harness that will be used to lift the adaptable rig. The particular means by which the rigging plates are affixed to the side rails is not particularly critical, so long as it is rated to withstand the stresses and loading associated the particular loads the rig will be lifting.

Figure 3:
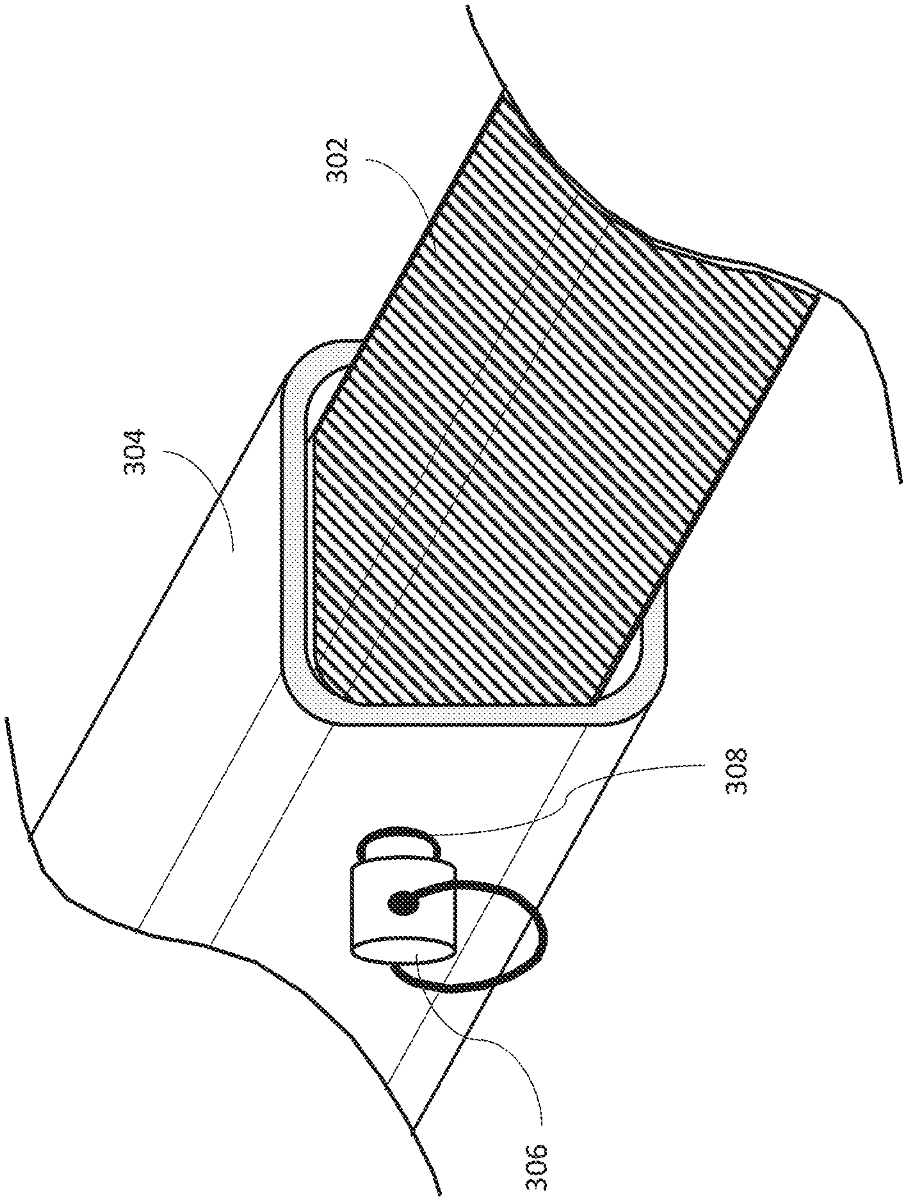
FIG. 3 is perspective view of a spacer affixed to a mating post on the adjustable rig of FIG. 2A.

FIG. 2A shows the mated components of 200. Each of mating posts (206, 208, 210, 212, 214 and 216) are inserted into a spacer tube (222, 224, 226). A mating post (302) is secured to a spacer (304) using a cotter pin, quick-release pin, nut and bolt, or similar fastener (306) that would be inserted into a channel (308) (approximately ⅜" in diameter in this particular embodiment) that passes through both the spacer bar and the mating post (see FIG. 3). Note that the distance between the approximate center line of side rail 202 and the approximate centerline of side rail 204 has been denoted as $d_1$. This distance is approximately 5' in the pictured embodiment.

Figure 4A:
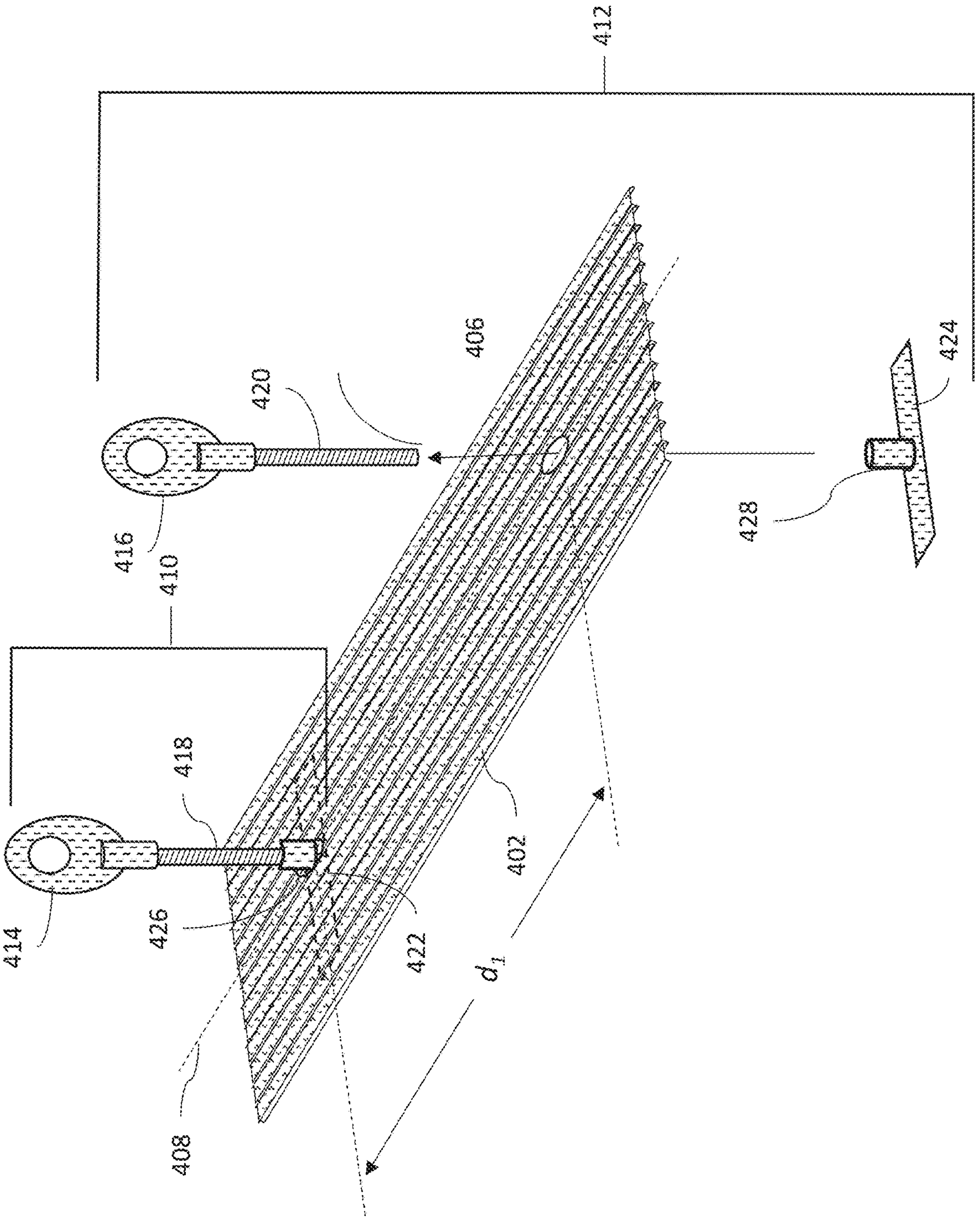
FIG. 4A is perspective view of corrugated flooring panel and associated attachment assemblies suitable for use with the adjustable rig of FIG. 2A.

FIG. 4A provides a perspective view of a single corrugated decking section (402). Such decking sections are widely available and commonly used as a flooring component in CFS construction. Typically, such decking sections are available in 24" and 36" widths, and in lengths as long as 30'. Decking section 402, as depicted in FIG. 4A, has dimensions of approximately 36" by 8'. As shown, there are two holes (404 and 406) in decking section 402. These are located along the longitudinal centerline (408) of decking section 402, spaced approximately distance $d_1$ from each other, where $d_1$ is the distance between the approximate center line of side rail 202 and the approximate centerline of side rail 204 (~5').

As also shown in FIG. 4A, each of two attachment assemblies (410 and 412) fabricated from ¼" steel. Each attachment assembly includes a rigging eye (414, 416) which is attached to a threaded rod (418, 420). The threaded rod is fabricated from steel and has a diameter of approximately ½" and a length of approximately 12". The attachment assembly also includes a base plate (422, 424) measuring approximately 3" by 18" and fabricated from ¼" steel, and center receptacle (426, 428), sized and threaded to mate with the threaded rods. To prepare a given corrugated decking section for connection to adaptable rig 200, the center rod of a rigging eye is threaded through each hole in the decking section, and the base plate is oriented so that it is approximately orthogonal to the centerline of the decking section. The threaded rod is then fastened to the center receptacle of the base plate. The particular dimensions and lengths of the attachment assembly is not particularly critical, so long as it is rated to withstand the stresses and loading associated the particular loads the rig will be lifting.

Figure 4B:
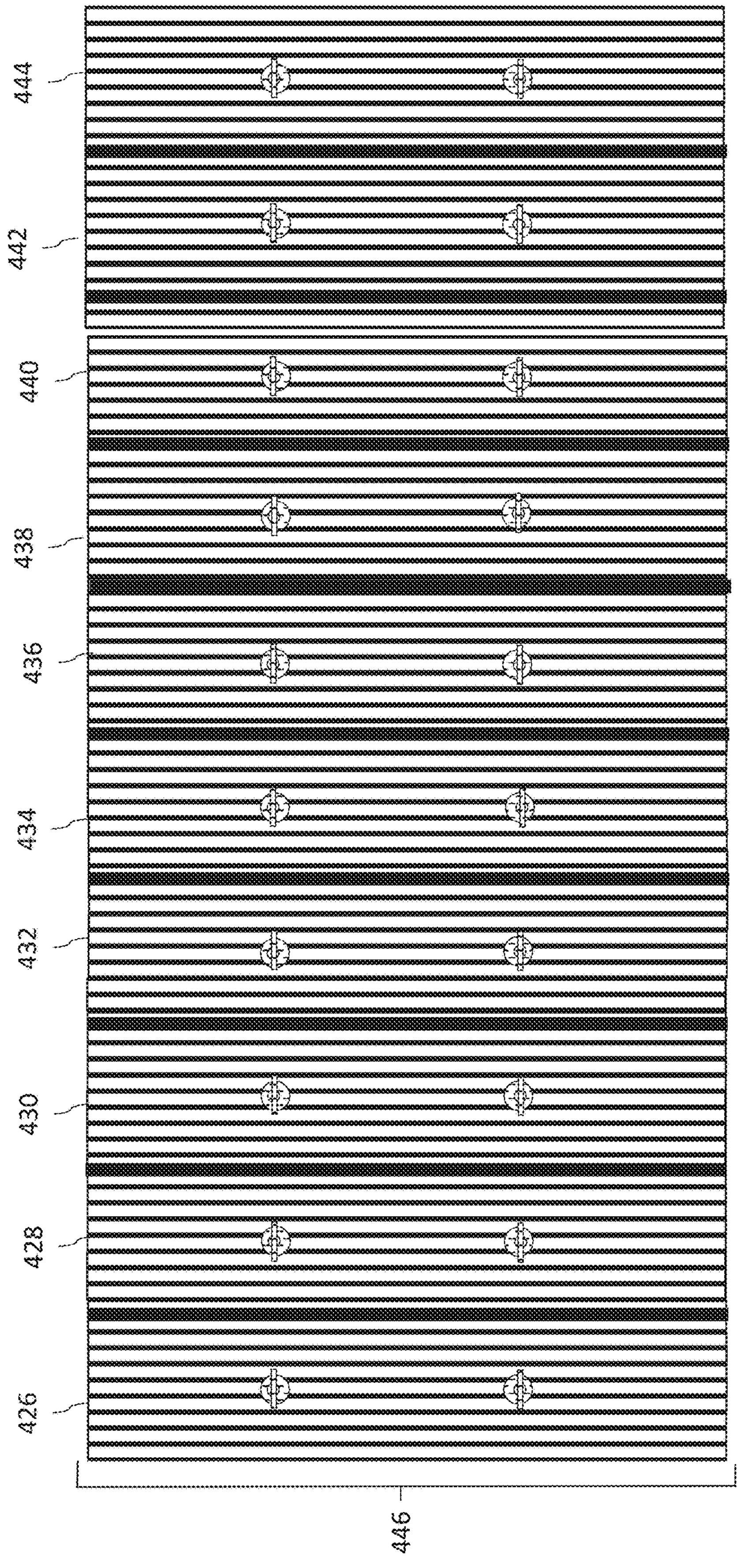
FIG. 4B is a top view of a joined assembly of ten corrugated flooring panels and the associated attachment assemblies suitable for use with the adjustable rig of FIG. 2A.

Multiple decking sections, and the associated attachment assemblies, are positioned adjacent to one another as shown in FIG. 4B. As shown ten decking sections (426, 428, 430, 432, 434, 436, 438, 440, 442 and 444) are situated so that they can be longitudinally joined to one another, thereby forming a single, joined multi-section assembly measuring approximately 8' by 30'. The method of joining can be mechanical (clips, screws, rivets, etc.) or welding. The particular method may be prescribed by the manufacturer of the decking sections, or dictated by the particular conditions and requirements at a given job site. Ideally, the joined multi-section assembly (446) would be assembled on a large, stable, level working space, preferably located at ground level, so that workers could quickly and safely situate and join the decking sections.

Figure 5A:
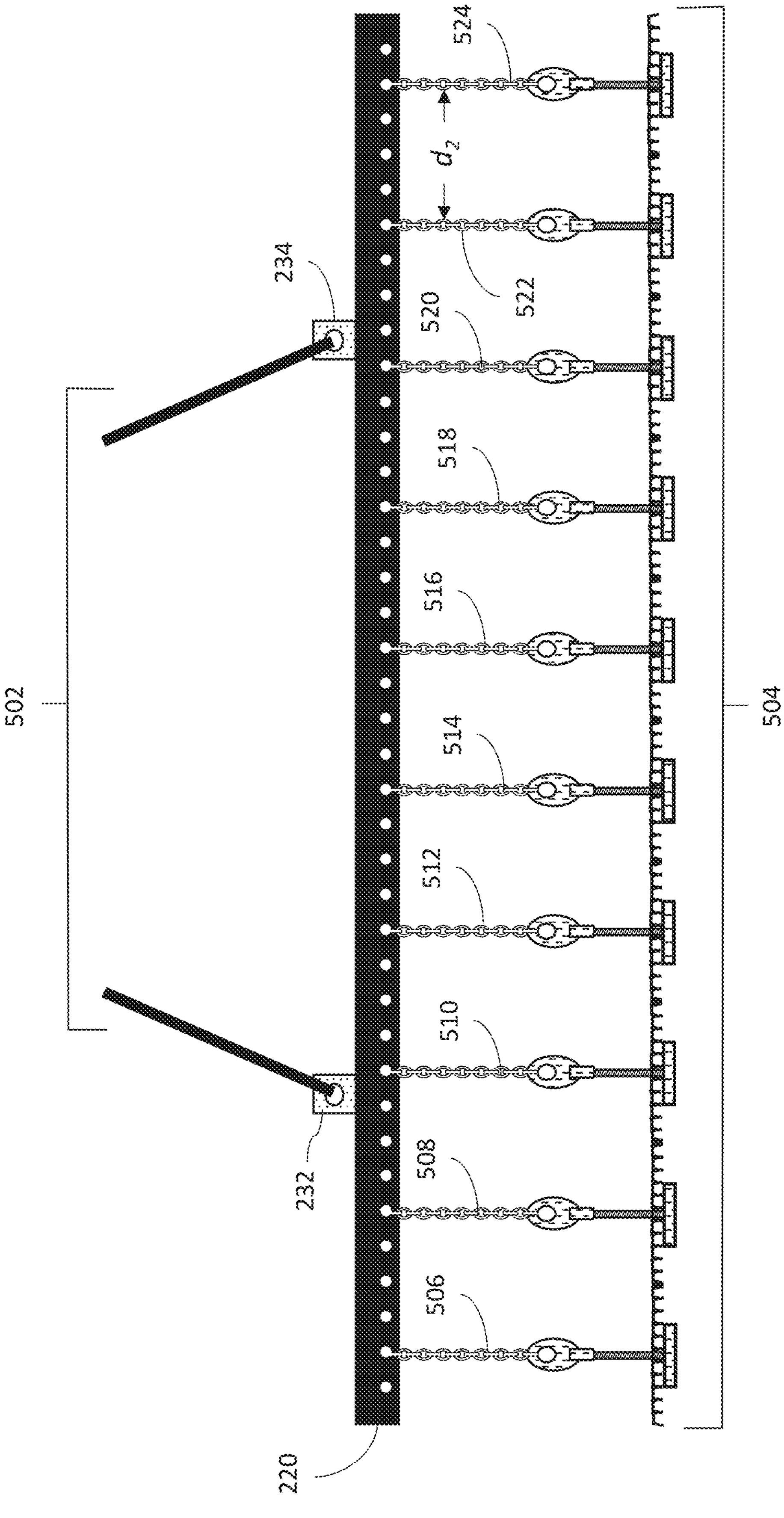
FIG. 5A is a longitudinal side-view of the rig of FIG. 2A connected to the assembly of FIG. 4B.
Figure 5B:
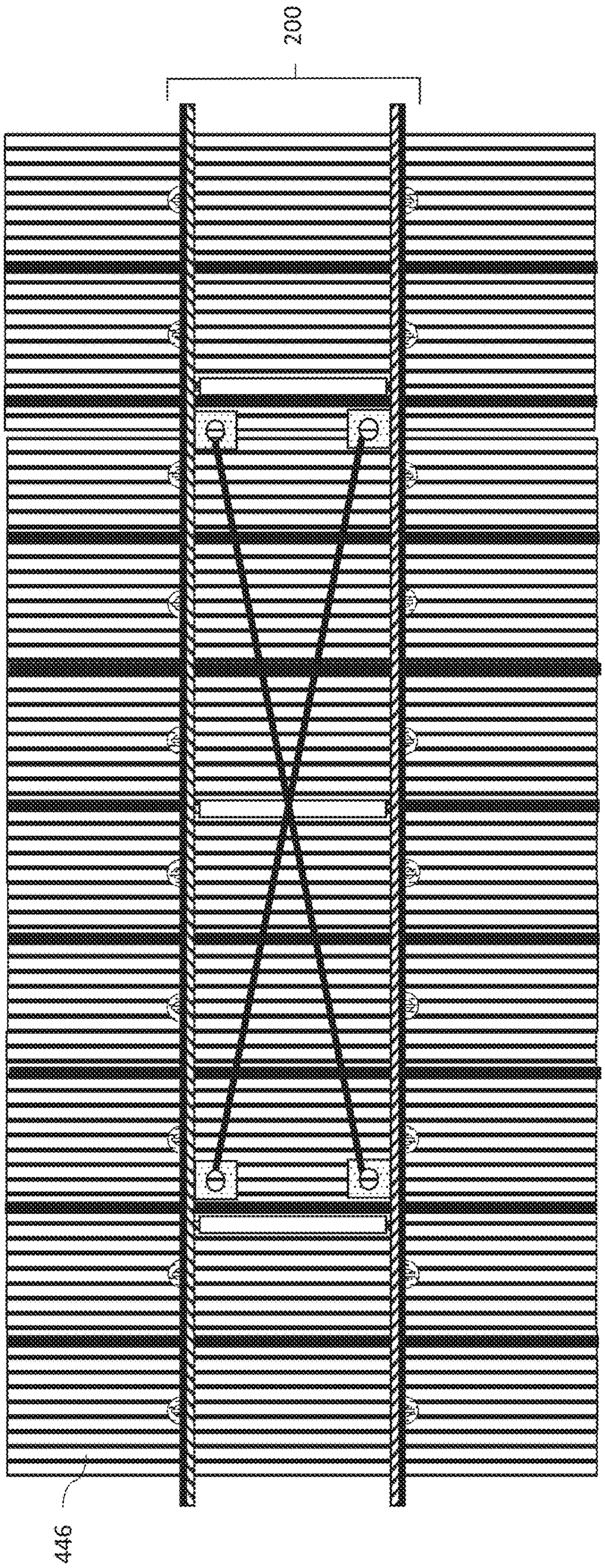
FIG. 5B is a top-view of the rig and assembly of FIG. 5A.

As shown in FIG. 5A, once the decking sections have been joined, adaptable rig 200 is lifted by a crane or other suitable lifting apparatus (502), and positioned over the multi-section assembly (446) and the associated attachment assemblies (504). Each attachment assembly is then connected to adaptable rig 200 by a chain (ten of which are depicted in FIG. 5—506, 508, 510, 512, 514, 516, 518, 520, 522, 524). Fasteners would be situated at each end point of each chain to facilitate the quick attachment/detachment of the chain to a given attachment assembly and one of the holes in the adaptable rig's side plates (side plate 220 is depicted in FIG. 5A). These fasteners could be hooks, carabiners, etc. Note that the particular holes in side plate 220 utilized to mate with the chains are located at approximately a distance of $d_2$ from one another. This distance is approximately equal to the width of an individual decking section (36" in this embodiment). This promotes even tension among the multiple chains as the joined multi-section assembly is lifted, and stability of the adaptable rig as it is moved between the assembly site and the delivery point for the multi-section assembly. FIG. 5B provides a top view of adaptable rig 200 positioned over and connected to joined multi-section assembly 446.

Figure 6:
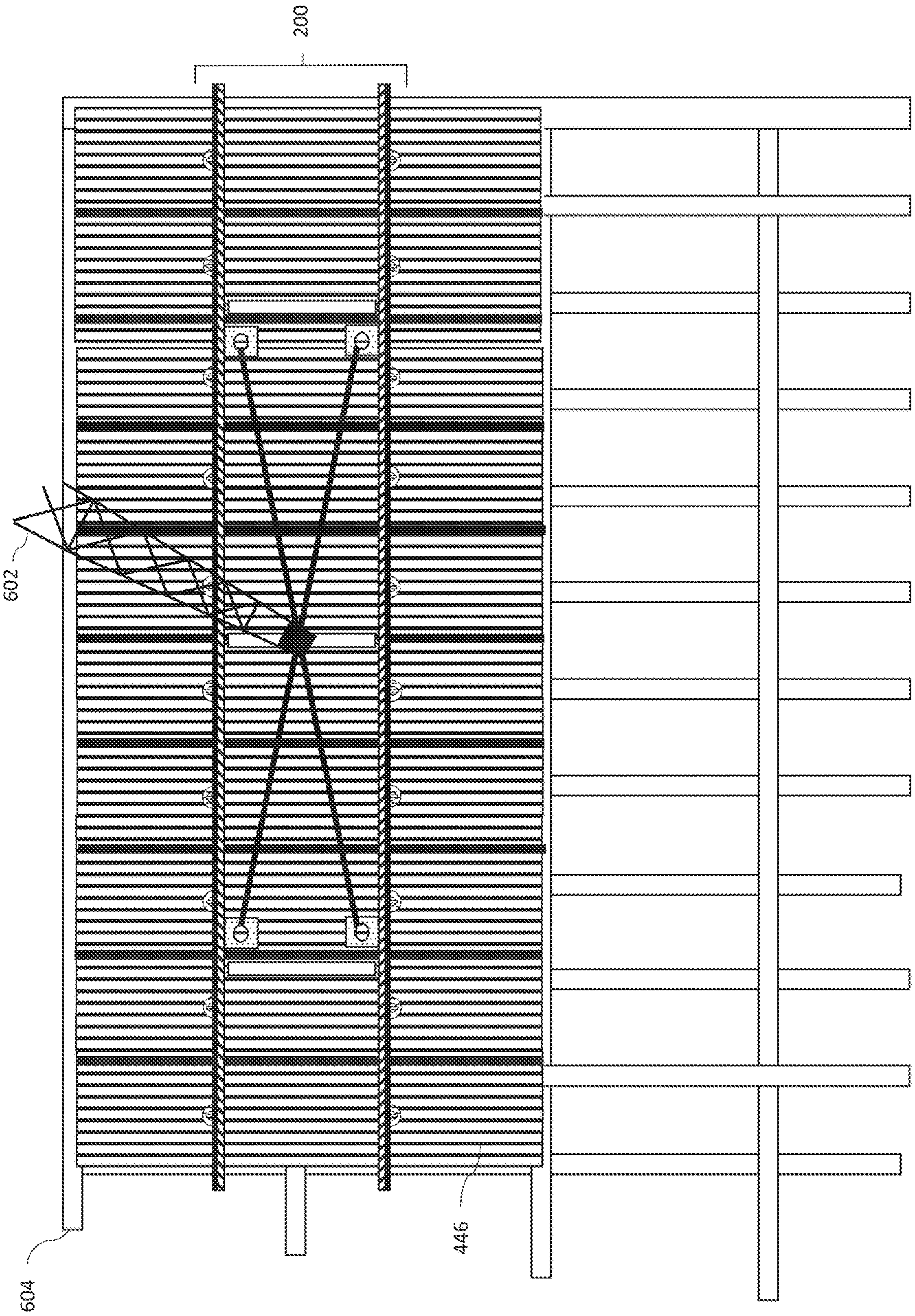
FIG. 6 is a top-view of the rig and assembly of FIG. 5A positioned above a CFS framing.

As shown in FIG. 6, adaptable rig 200 and attached joined multi-section assembly 446 are then lifted by a crane (602), or other suitable lifting equipment, and positioned over and lowered onto a CFS framing (604). Once joined multi-section assembly 446 is properly positioned and resting upon CFS framing 604, the chains are disconnected from each of the 20 attachment assemblies associated with joined multi-section assembly 446, and the attachment assemblies are removed. Workers now have a large (8'×30') stable platform measuring to stand upon while they perform the actions necessary to permanently attach joined multi-section assembly 446 to CFS framing 604.

Figure 7:
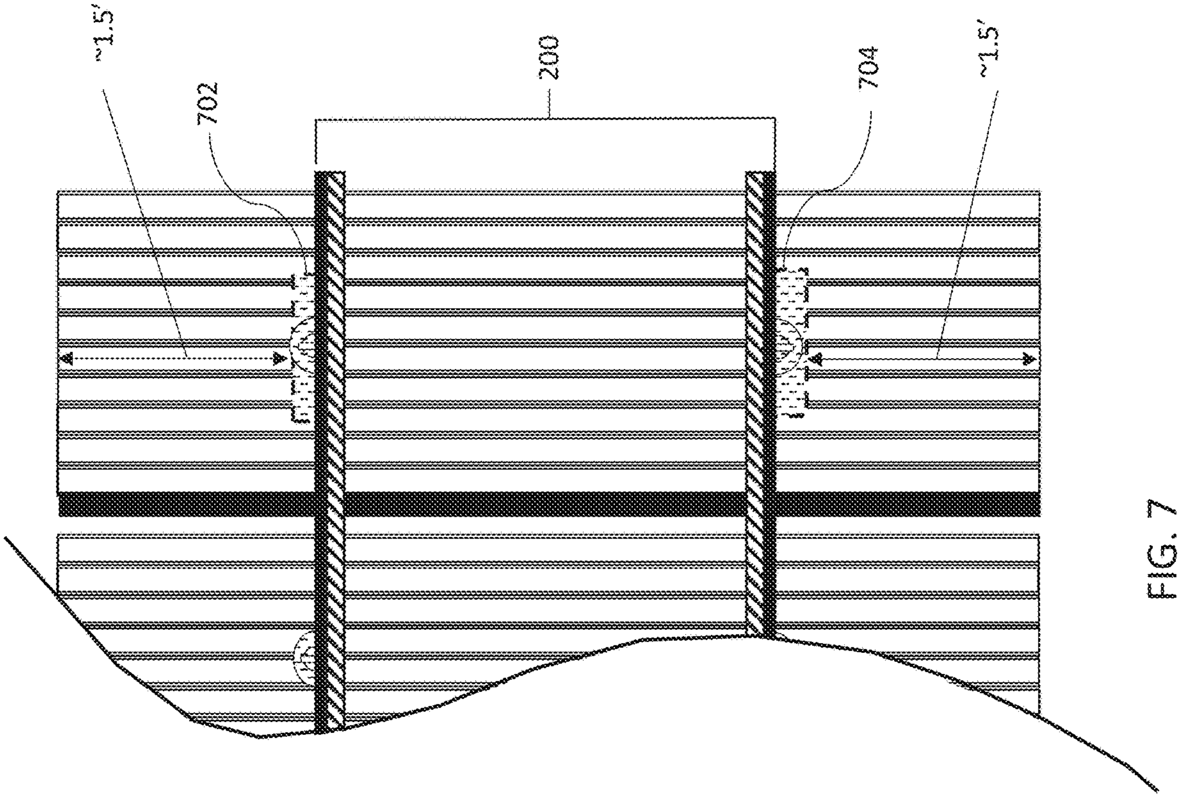
FIG. 7 provides an expanded top-view of a corrugated flooring panel connected to the rig of FIG. 2A.

For the lifting of the particular multi-section assembly discussed in the above embodiment, spacers having a length of 4'10" were utilized. This resulted in the separation of the side panels of the adaptable rig being approximately 5' apart from each other. Thus, for an 8' long corrugated flooring section, with holes for attachment assemblies situated to align with the side panels spacing of 5', each panel would extend approximately 1.5' out and away from each attachment assembly base plate (702, 704) (see FIG. 7). This "overhang of 1.5 feet was chosen as it was the maximum permissible overhang recommended by the manufacturer of the corrugated flooring panels utilized in the above embodiment. However, this overhang will vary as a function of the gauge of material a given flooring panel Is fabricated from, as well as with the depth and configuration of the panel's corrugation.

Figure 8A:
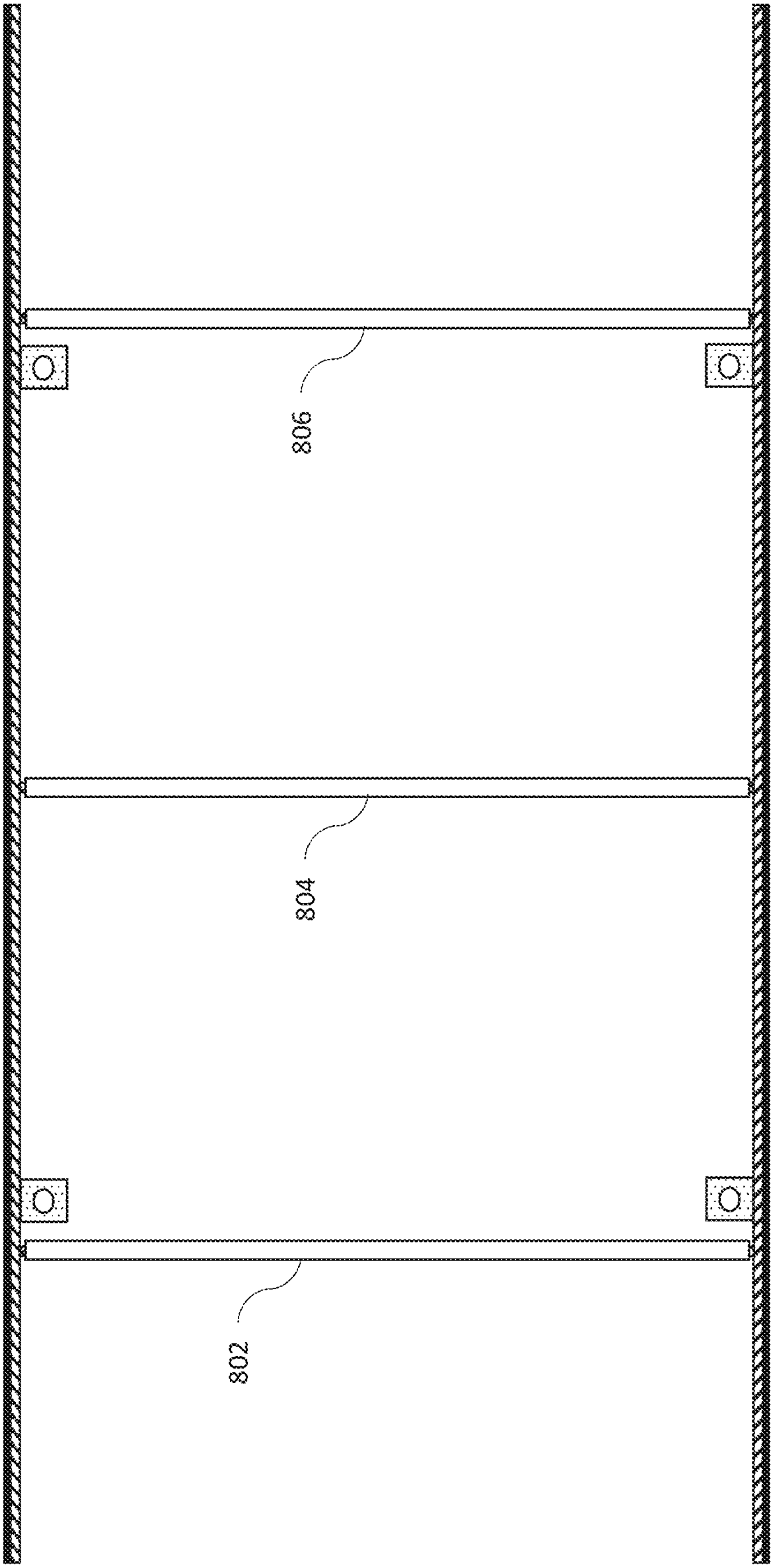
FIG. 8A is a top-view of an alternate embodiment of an adaptable rig employing extended spacers.
Figure 8B:
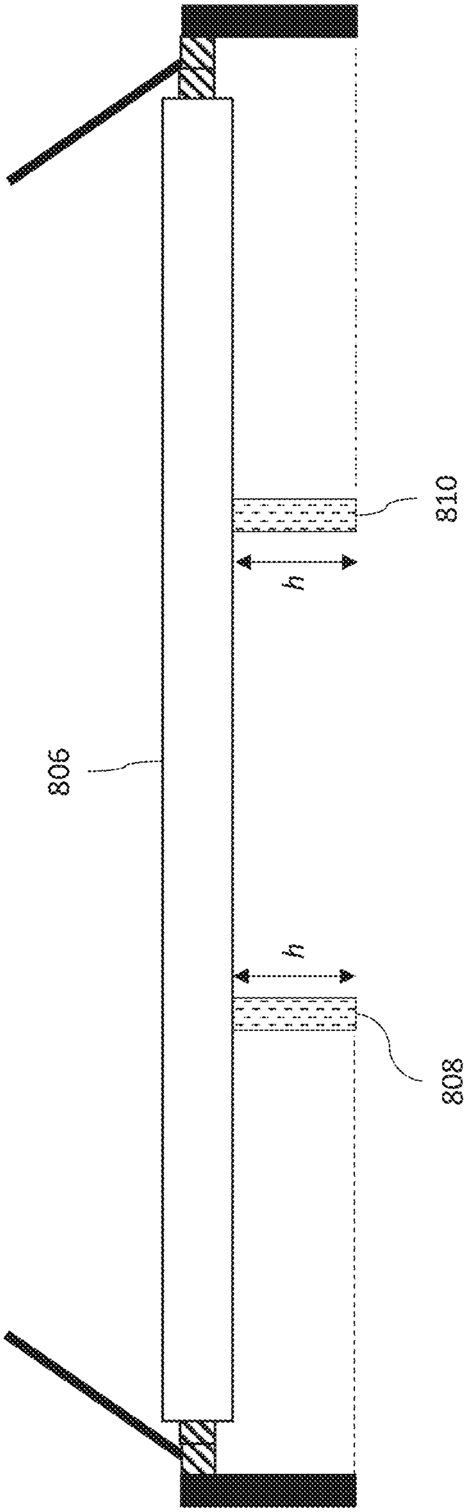
FIG. 8B is a side-view if the rig of FIG. 8A.
Figure 8D:
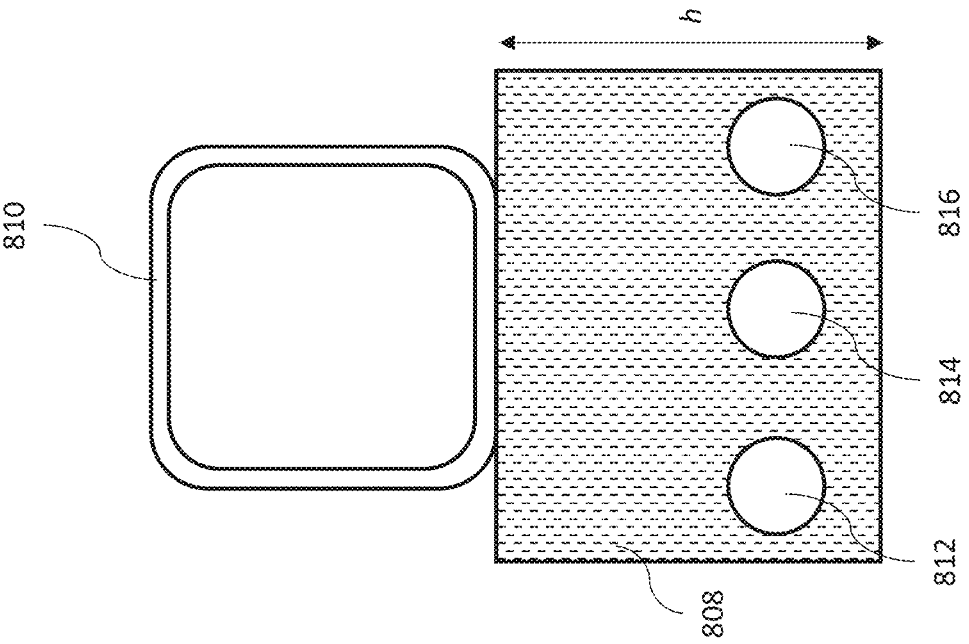
FIG. 8D is an expanded longitudinal side-view of the connection panel of FIG. 8C.
Figure 8C:
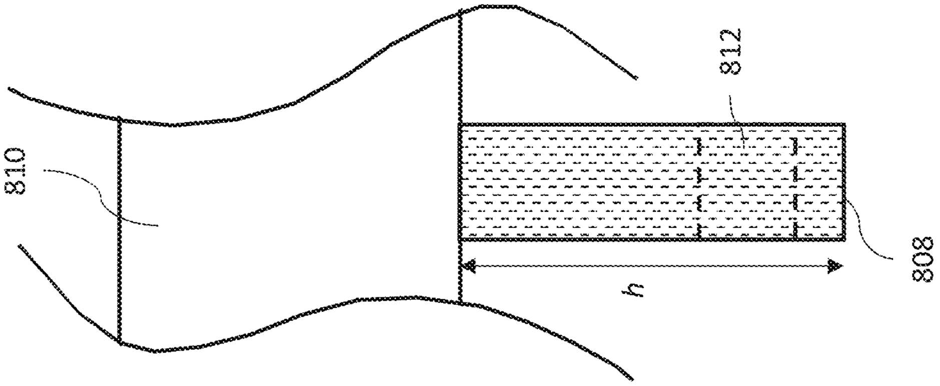
FIG. 8C is an expanded view of a connection panel affixed to a spacer associated with the rig of FIG. 8A.

As noted above, various flooring panel will have differing physical characteristics and dimensions (commercially-available corrugated flooring panels can have lengths that vary between 6' and almost 30'). Consequently, to avoid excessive overhanging of the joined panels from the adaptable rig side panels, spacers of varying lengths may be employed to configure the adaptable rig. For example, as shown in FIG. 8A, the adaptable rig may be configured with three spacers (802, 804 and 806), each having a length of 14'10". This would result in the side panels of the rig being separated from each other by a distance of approximately 15'. This extended adaptable rig configuration would be capable of lifting a 15' by 30' foot assembly of joined flooring panels. Such a large assembly would likely require additional attachment assembly to be utilized so that the interior regions of the assembly were properly supported. As shown in FIG. 8B, which provides a side view of spacer 806, situated between the side rails and side panels of the adaptable rig, multiple connection panels (808 and 810) are affixed (preferably by welding) to the underside of spacer 906. Each of these panels has a height, h, so that the bottom of each connection panel extends below spacer 906 so that it is even with the bottom of the adaptable rig's side panels. FIG. 8C provides an enlarged view of connection panel 808 to spacer 810. The longitudinal side-view of connection panel 808 provided in FIG. 8D illustrates that the connection panels can have a longitudinal dimension in excess of the cross-sectional dimension of spacer 810, and that multiple holes (812, 814 and 816), each adapted to mate with a chain or cable that will be used to connect the adaptable rig to its load, are provided for in the connection panel. (not currently part of the system, but keep in if you suggest for future flexibility)

Figure 9A:
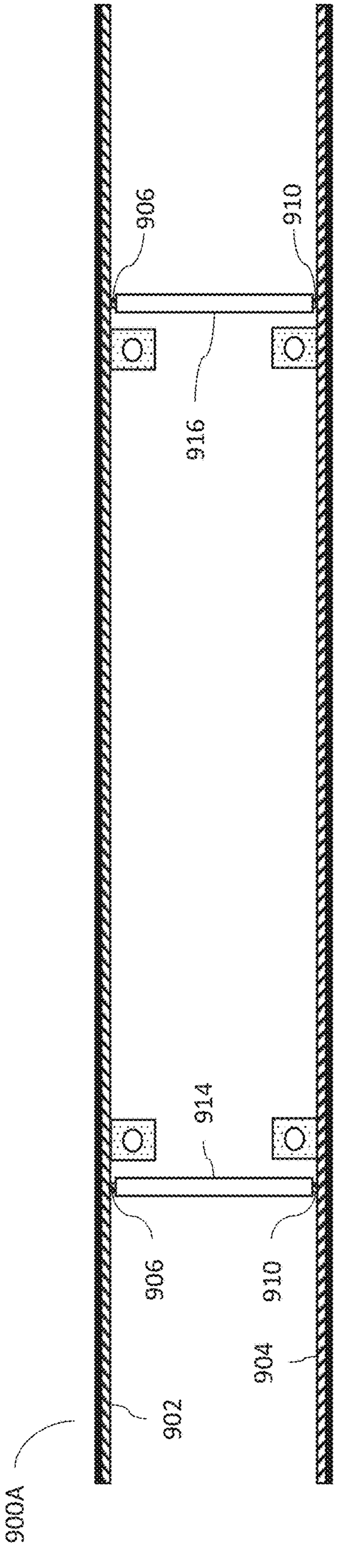
FIG. 9A is a top-view of an alternate embodiment of an adaptive rig wherein two spacers are utilized.
Figure 9B:
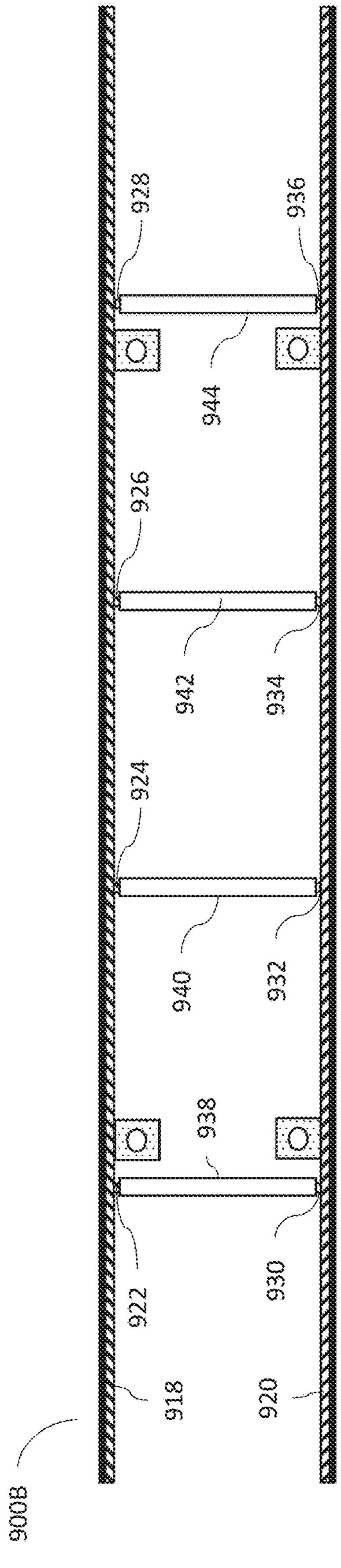
FIG. 9B is a top-view of an alternate embodiment of an adaptive rig wherein four spacers are utilized.

In addition, other alternate embodiments of the adaptable rig can include varying numbers of mating posts and spacers, depending upon the weight and rigidity of the particular joined multi-section assemblies that will be lifted. For example, FIG. 9A depicts adaptable rig 900A wherein each side rail (902, 904) has only two mating posts (906, 908 and 910, 912), and consequently only two spacers (914, 916) are required. FIG. 9B depicts adaptable rig 900B wherein each side rail (918, 920) has four mating posts (922, 924, 926, 928 and 930, 932, 934, 936), and consequently requires four spacers (938, 940, 942, 944).

Although the invention herein has been described with reference to particular embodiments, it is to be understood that these embodiments are merely illustrative of the principles and applications of the present invention. For example, the attachment means could include an electromagnet or suction device adapted to latch on to and/or grasp the surface of one or more flooring panels. The holes for mating with the attachment rigs (or sites where an electromagnet or a suction device might grasp the surface of a flooring component) need not be present in every flooring component that the adaptable rig is lifting. The material, thickness and/or rigidity of the flooring components could permit such holes or grasping sites to be located upon every other, or every forth flooring component. In addition, the invention is not limited to use in a CFS framing environment. It will be understood that the disclosed adaptive rigs could be utilized in any situation or environment requiring the lifting and placement of joined building elements that require a multi-point, distributed lifting apparatus. All of the above variations, and reasonable extensions thereof, could be implemented and practiced without departing from the spirit and scope of the present invention as defined by the appended claims.

The invention claimed is:

1. An adaptable rig comprising:

a first rail having a substantially rectangular cross-section and a plurality of mating posts mounted on a first side of the first rail, wherein each post is situated so that its primary axis is orthogonal to a primary axis of the first rail;

a second rail having a substantially rectangular cross-section and a plurality of mating posts mounted on a first side of the second rail, wherein each post is situated so that its primary axis is orthogonal to a primary axis of the second rail;

a first panel mounted upon a second side of the first rail that is opposite to the first side, the first panel having a length substantially equal to a length of the first rail, and including a plurality of mounting points positioned along the length of the first panel;

a second panel mounted upon a second side of the second rail that is opposite to the first side, the second panel having a length substantially equal to a length of the second rail, and including a plurality of mounting points positioned along the length of the second panel;

a plurality of spacer tubes having an inner profile adapted to accept insertion of the mating posts on the first and second rails, wherein each of the plurality spacer tubes has a first end and a second end, and wherein each of the mating posts on the first rail are detachably inserted in and coupled to the first end of one of the spacer tubes, and each of the mating posts on the second rail are detachably inserted in and coupled to the second end of one of the spacer tubes, so that the plurality of spacer tubes serves to bridge the first rail to the second rail; and a plurality of attachment assemblies, each adapted to detachably couple to one or more discrete flooring components, wherein the one or more discrete flooring components are joined to form a single panel of flooring.

2. The adaptable rig of claim 1 wherein the first and second rails further comprise at least one rigging point adapted to link the adaptable rig to equipment capable of lifting the adaptable rig.

3. The adaptable rig of claim 1 wherein the first and second rails each comprise two rigging points, each of the rigging points being adapted to link the adaptable rig to equipment capable of lifting the adaptable rig.

4. The adaptable rig of claim 1 wherein the one or more discrete flooring components are specifically adapted for use in a cold-forged steel framing environment.

5. The adaptable rig of claim 1 wherein the first and second rails and the mating posts of each of the first and second rails are fabricated from steel tubing having a 1.5 inch square outer cross-section and a thickness of approximately 0.25".

6. The adaptable rig of claim 1 wherein the spacer tubes are fabricated from steel tubing having a 2 inch square outer cross-section and a thickness of approximately 0.1875".

7. The adaptable rig of claim 1 wherein the plurality of attachment assemblies are selected from the group consisting of:

a flexible cable;

a chain;

a carabiner;

an electromagnet;

a suction device; and a mechanical connector adapted to pass through a void in at least one of the one or more discrete flooring components and extends laterally to support the at least one of one or more discrete flooring components.

8. The adaptable rig of claim 1, wherein the one or more discrete flooring components comprise a corrugated decking.

9. The adaptable rig of claim 8, wherein the corrugated decking is selected from the group consisting of:

a ferrous metal;

a non-ferrous metal; and a composite material.

10. A method for lifting a single panel of flooring, wherein the single panel is comprised of two or more discrete flooring components that are joined, the method comprising:

detachably coupling each of a plurality of attachment assemblies of the adaptable rig of claim 1 to a respective one of the two or more discrete flooring components of the single panel of flooring;

lifting the adaptable rig and the single panel of flooring detachable detachably coupled to the adaptable rig by the attachment assemblies; and detaching the attachment assemblies from each of the two or more discrete flooring components.

11. The method of claim 10, further comprising:

translating the adaptable rig and the detachably coupled single panel of flooring to a desired work site prior to detaching the attachment assemblies from the discrete flooring components.

12. The method of claim 10, further comprising:

before lifting the adaptable rig and the single panel of flooring detachably coupled thereto, detachably coupling the first and second rails of the adaptable rig to equipment capable of lifting the adaptable rig via at least one rigging point on each of the first and second rails.

13. The method of claim 10, further comprising:

before lifting the adaptable rig, detachably coupled thereto, detachably coupling the first and second rails of the adaptable rig to equipment capable of lifting the adaptable rig via two rigging points on each of the first and second rails.

14. The method of claim 10, wherein the two or more discrete flooring components are specifically adapted for use in a cold-forged steel framing environment.

15. The method of claim 10, wherein the first and second rails and the mating posts of each of the first and second rails are fabricated from steel tubing having a 1.5 inch square outer cross-section and a thickness of approximately 0.25".

16. The method of claim 10, wherein the spacer tubes are fabricated from steel tubing having a 2 inch square outer cross-section and a thickness of approximately 0.1875".

17. The method of claim 10, wherein the plurality of attachment assemblies are selected from the group consisting of:

a flexible cable;

a chain;

a carabiner;

an electromagnet;

a suction device; and a mechanical connector adapted to pass through a void in at least one of one or more discrete flooring components and extends laterally to support the at least one of one or more discrete flooring components.

18. The method of claim 17, wherein the corrugated decking is selected from the group consisting of:

a ferrous metal;

a non-ferrous metal; and a composite material.

19. The method of claim 10, wherein the one or more flooring components comprise a corrugated decking.

* * * * *